J. F. BURNS.
MILK BOTTLE.
APPLICATION FILED MAY 8, 1919.
1,366,056.
Patented Jan. 18, 1921.
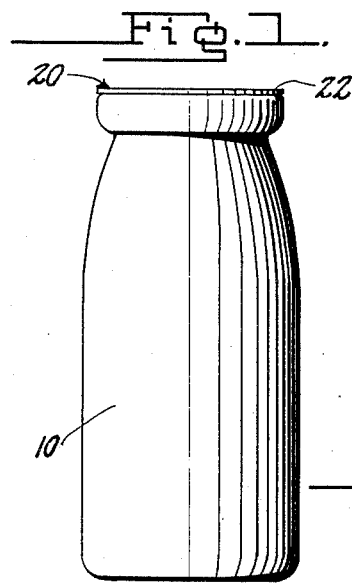
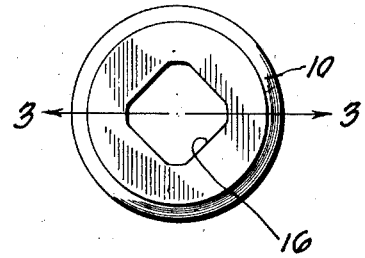
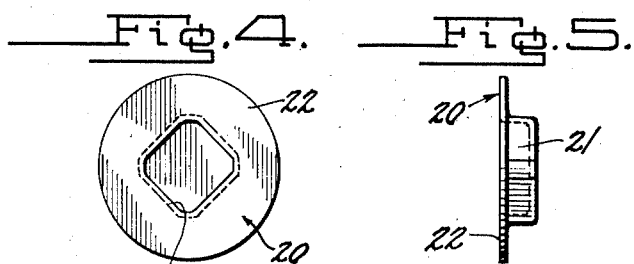
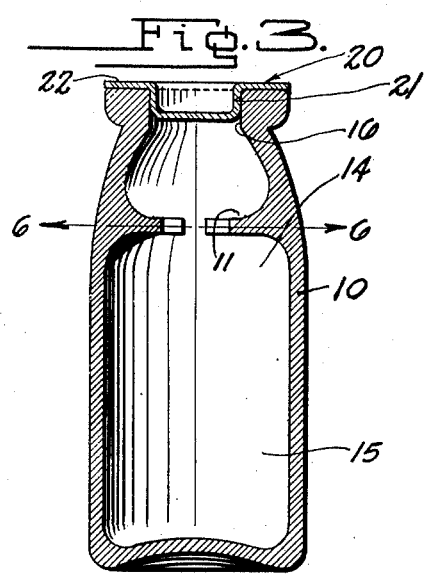
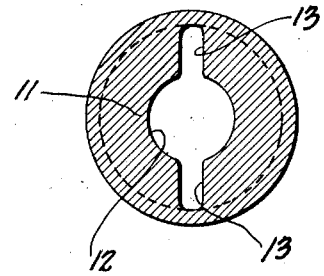
John F. Burns.
Inventor
By Lancaster and Allwine
Attorneys

UNITED STATES PATENT OFFICE.

JOHN F. BURNS, OF ST. LOUIS, MISSOURI.

MILK-BOTTLE.

1,366,056.  Specification of Letters Patent.  Patented Jan. 18, 1921.

Application filed May 8, 1919. Serial No. 295,594.

*To all whom it may concern:*

Be it known that I, JOHN F. BURNS, a citizen of the United States, residing at St. Louis, in the county of St. Louis and State of Missouri, have invented certain new and useful Improvements in Milk-Bottles, of which the following is a specification.

This invention relates to milk bottles, and an object of the invention is to provide a bottle which is adaptable for use only in containing liquid.

The relatively wide mouths of milk bottles commonly employed in dispensing of milk, cream, buttermilk and the like, together with the cap retaining shoulders thereof, particularly adapt the said bottles for use in canning pickles, preserves or the like, and consequently numerous bottles of this type are employed by housewives for canning pickles, or the like resulting in a shortage of bottles for the dairyman, and it is an object of this invention to provide a horizontal partition formed integrally with the walls of the bottle, intermediate of its ends, which partition is provided with a relatively small opening, and being of sufficient size to permit the flow of the milk or liquid therethrough, but prevent the passage of pickles, preserves or the like therethrough, thereby eliminating the usefulness of the bottle as a container for such articles.

A still further object of the invention is to provide a milk bottle as specified, in which the mouth is constricted, which co-acts with the partition therein, rendering the bottle un-adaptable for use as a container for preserving edibles.

Another object of the invention is to provide a cap for closing the bottle, which includes a disk-like body, the rim portion of which engages flat against the upper surface of the bottle, and which cap has a depressed portion adapted to fit into the neck or mouth of the bottle, for forming a closure therefor, the said cap entirely covering the mouth or open end of the bottle for preventing the accumulation of dirt, germs or other foreign material upon the bottle over which the milk would pass when being poured from the bottle.

Other objects of the invention will appear in the following detailed description, taken in connection with the accompanying drawing, forming a part of this specification, and in which drawing:

Figure 1 is a side elevation of the improved milk bottle.

Fig. 2 is a top plan of the milk bottle.

Fig. 3 is a section on the line 3—3 of Fig. 2.

Fig. 4 is a top plan of the cap for the bottle.

Fig. 5 is a side elevation of the cap, and

Fig. 6 is a cross section through the bottle taken on the line 6—6 of Fig. 3.

Referring more particularly to the drawing, 10 indicates the bottle as an entirety which is made of glass or any other suitable material, and to contain a predetermined quantity, as is ordinary in the construction of bottles used in the dispensing of milk, cream, buttermilk or the like. The bottle 10 is provided with a horizontal partition 11 formed integrally therewith, substantially equi-distant of the end of the bottle which partition is provided with an opening 12 centrally therein. The opening 12 may be of any desired shape; however it is preferable to provide a substantially circular opening in the center of the partition having a pair of diametrically opposed radiating wings 13 formed thereon. This partition 11, will permit milk or other liquid to pass from the upper compartment 14 of the bottle into the lower compartment 15 thereof or vice-versa, however it will effectively prevent the filling of the bottle with various types of edibles, such as pickles, preserves, jelly or the like, in that it would be difficult to pass such edibles through the opening 12.

To further assist in rendering the bottle un-adaptable for use as a container for edibles, the mouth 16 thereof is reduced, considerably more than in the ordinary milk bottle and it is polygonal in shape as clearly shown in Fig. 2 of the drawing, thereby eliminating the provision of a shoulder, upon which a closure might rest and be sealed.

The diametrically opposed wings 13 of the opening 12 extend to the inner surface of the walls or sides of the bottle, so as to permit the entire contents to be poured from the lower compartment 15. It will also be noted by particular reference to Fig. 3 of the drawing, that the partition 11 gradually merges, by arcuate enlargements into the walls of the bottle, preventing the forming of square corners or crevices in the bottle, which would retain milk or other liquid contents from the bottle, and also prevent the thorough cleaning of the bottle.

The cap closure 20 for the bottle is made of pasteboard, or any desirable material and it is provided with a centrally depressed portion 21 shaped to conform to the shape or configuration of the mouth 16 of the bottle 10, being adapted to extend downwardly into the mouth of the bottle for connecting the cap thereto. The rim portion 22 of the cap fits snugly against and entirely covers the top of the bottle surrounding the mouth thereof, as clearly shown in Fig. 3 of the drawing, forming a protection of this portion of the bottle to prevent the accumulation of dirt, germs or other foreign material thereon, consequently preventing the mixing of such foreign material with the milk when it is poured from the bottle.

Changes in details may be made without departing from the spirit of this invention, but;

I claim:

As a new article of manufacture, a milk bottle provided with a transverse flat partition therein, said partition formed integrally with the bottle and being provided with a centrally disposed relatively small opening, and laterally extending enlargements upon said opening formed in said partition and extending to the inner walls of the bottle.

JOHN F. BURNS.